United States Patent
Yoo et al.

(10) Patent No.: US 12,554,422 B2
(45) Date of Patent: Feb. 17, 2026

(54) STORAGE DEVICE ENTERING LOW POWER MODE AFTER EXECUTING BACKGROUND OPERATION AND OPERATING METHOD OF THE STORAGE DEVICE

(71) Applicant: SK hynix Inc., Gyeonggi-do (KR)

(72) Inventors: Sung Ju Yoo, Gyeonggi-do (KR); Jong Bo Bae, Gyeonggi-do (KR); Jung Ho Lee, Gyeonggi-do (KR); Ji Hun Choi, Gyeonggi-do (KR); Bu Yong Song, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 292 days.

(21) Appl. No.: 18/505,113

(22) Filed: Nov. 9, 2023

(65) Prior Publication Data

US 2025/0021244 A1    Jan. 16, 2025

(30) Foreign Application Priority Data

Jul. 11, 2023    (KR) .................. 10-2023-0089482

(51) Int. Cl.
*G06F 3/06* (2006.01)
(52) U.S. Cl.
CPC .......... *G06F 3/0625* (2013.01); *G06F 3/0634* (2013.01); *G06F 3/064* (2013.01); *G06F 3/0656* (2013.01); *G06F 3/0659* (2013.01); *G06F 3/0673* (2013.01)

(58) Field of Classification Search
CPC ...... G06F 3/0625; G06F 3/0634; G06F 3/064; G06F 3/0656; G06F 3/0659; G06F 3/0673
USPC ........................................................ 365/227
See application file for complete search history.

(56) References Cited

U.S. PATENT DOCUMENTS

| | | | |
|---|---|---|---|
| 11,531,473 B1 | 12/2022 | Ionin et al. | |
| 2010/0106886 A1* | 4/2010 | Marcu | G06F 1/3275 713/323 |
| 2012/0260116 A1* | 10/2012 | Chen | G06F 1/3221 713/324 |
| 2015/0179238 A1* | 6/2015 | Park | G11C 7/20 365/189.011 |
| 2020/0409602 A1* | 12/2020 | Lee | G06F 3/0656 |
| 2023/0367491 A1* | 11/2023 | Zhao | G06F 3/0659 |
| 2024/0281158 A1* | 8/2024 | Kim | G06F 3/0683 |

FOREIGN PATENT DOCUMENTS

| | | |
|---|---|---|
| KR | 10-2020-0054538 A | 5/2020 |
| KR | 10-2022-0150180 A | 11/2022 |

\* cited by examiner

*Primary Examiner* — Ly D Pham
(74) *Attorney, Agent, or Firm* — IP & T GROUP LLP

(57) ABSTRACT

A storage device may read a plurality of data units from a host memory buffer prior to entering a low power mode, release a communication link with the host after reading the plurality of data unit, execute a background operation based on at least one of the plurality of data units, and enter into the low power mode after executing the background operation.

20 Claims, 13 Drawing Sheets

STORAGE DEVICE ENTERING LOW POWER MODE AFTER EXECUTING BACKGROUND OPERATION AND OPERATING METHOD OF THE STORAGE DEVICE

CROSS-REFERENCES TO RELATED APPLICATION

The present application claims priority under 35 U.S.C. 119(a) to Korean patent application number 10-2023-0089482 filed on Jul. 11, 2023, which is incorporated herein by reference in its entirety.

BACKGROUND

1. Technical Field

Various embodiments of the present disclosure generally relate to a storage device entering low power mode after executing a background operation and operating method of the storage device.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

Meanwhile, the storage device may access data stored in a host memory buffer in the host. The storage device may read data stored in the host memory buffer and execute an internal operation based on the read data.

SUMMARY

Embodiments of the present disclosure may provide a storage device capable of minimizing power consumed to run background operations when a host enters a low power mode, and an operating method of the storage device.

In one aspect, embodiments of the present disclosure may provide a storage device including a memory configured to store data; and a controller configured to receive, from a host, a request for entering a low power mode; read, prior to entering the low power mode, a plurality of data units from a host memory buffer; release a communication link with the host after reading the plurality of data units; execute a background operation based on at least one of the plurality of data units; and enter the storage device into the low power mode after executing the background operation.

In another aspect, embodiments of the present disclosure may provide an operating method of a storage device including reading, prior to entering a low power mode, a plurality of data units from a host memory buffer; releasing a communication link with a host; executing a background operation based on at least one of the plurality of data units; and entering into the low power mode after executing the background operation.

In another aspect, embodiments of the present disclosure may provide a storage device including a memory configured to store data; and a controller configured to determine whether a condition for the storage device to enter a low power mode is satisfied; transmit a signal indicating that the storage device entered the low power mode to a host when the condition is satisfied; read a plurality of data units from a host memory buffer included in the host; release a communication link with the host after reading the plurality of data units; execute a background operation based on at least one of the plurality of data units; and enter the storage device into the low power mode after executing the background operation.

According to embodiments of the present disclosure, it is possible to minimize power consumed to run background operations when host enters a low power mode.

DETAIL DESCRIPTION

Figure 1:
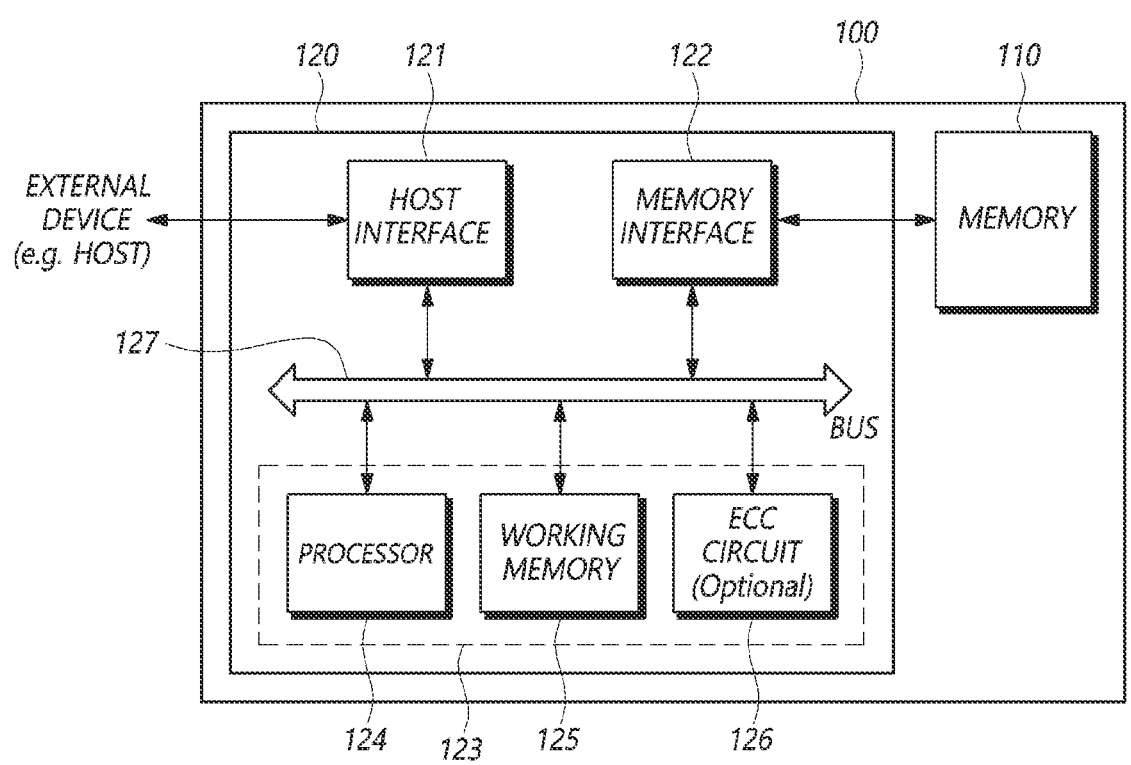
FIG. 1 is a schematic configuration diagram of a storage device according to an embodiment of the present disclosure.

Hereinafter, embodiments of the present disclosure are described in detail with reference to the accompanying drawings. Throughout this specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array, which is selected by the address. The memory 110 may perform an operation instructed by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control operations of the memory 110 according to a request from an external device (e.g., a host) located outside the storage device 100. The controller 120, however, also may control the operations of the memory 110 regardless of a request from the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require a storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 provides an interface that uses at least one of various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a request from the host, the control circuit 123 may receive the request through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform general control operations of the controller 120 to control operations of the memory 110. To this end, for instance, the control circuit 123 may include a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control operations of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware, is a program to be executed in the storage device 100 to drive the storage device 100, and may include various functional layers. For example, the firmware may include binary data in which codes for executing the functional layers, respectively, are defined.

For example, the firmware may include at least one of a flash translation layer (FTL) which performs a translating function between a logical address requested to the storage device 100 from the host and a physical address of the memory 110; a host interface layer (HIL) which serves to analyze a request from the host and transfers a command corresponding to the request, to the flash translation layer (FTL); and a flash interface layer (FIL) which transfers the command instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in the last read data. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
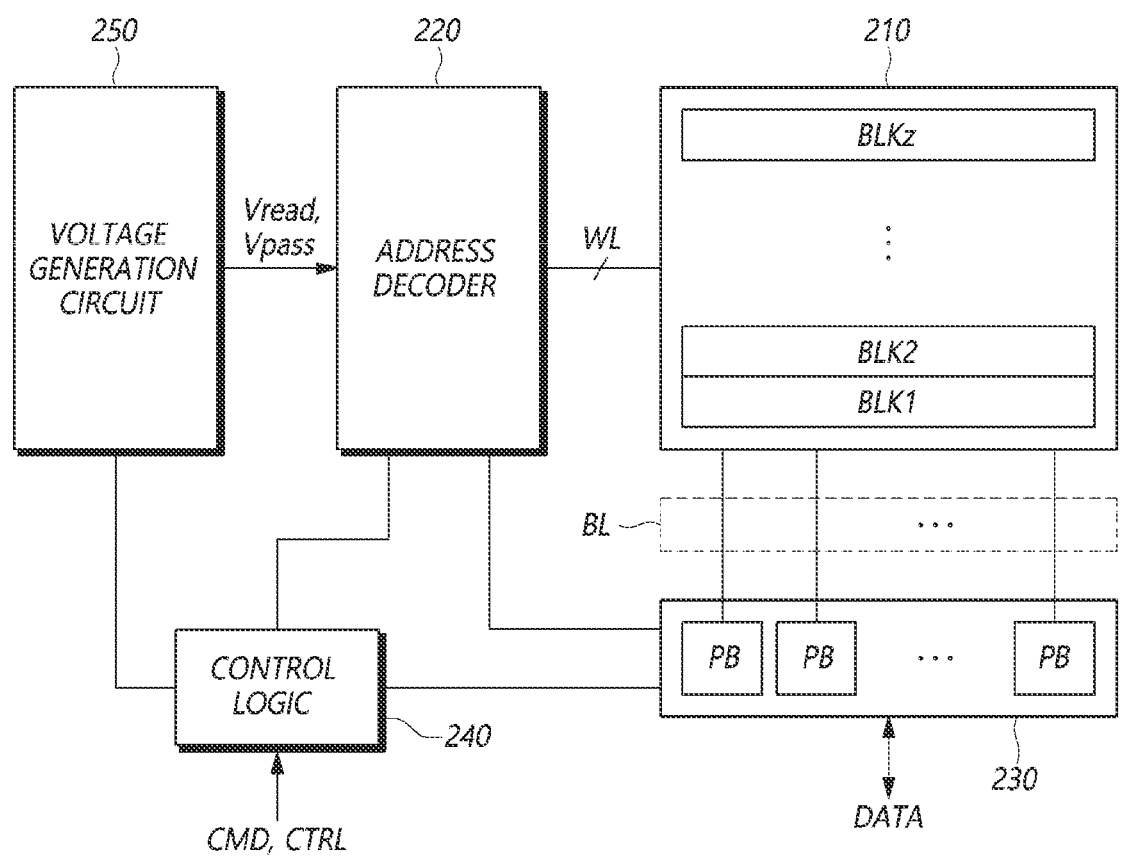
FIG. 2 is a block diagram schematically illustrating a memory of FIG. 1.

FIG. 2 is a block diagram schematically illustrating the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 under the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
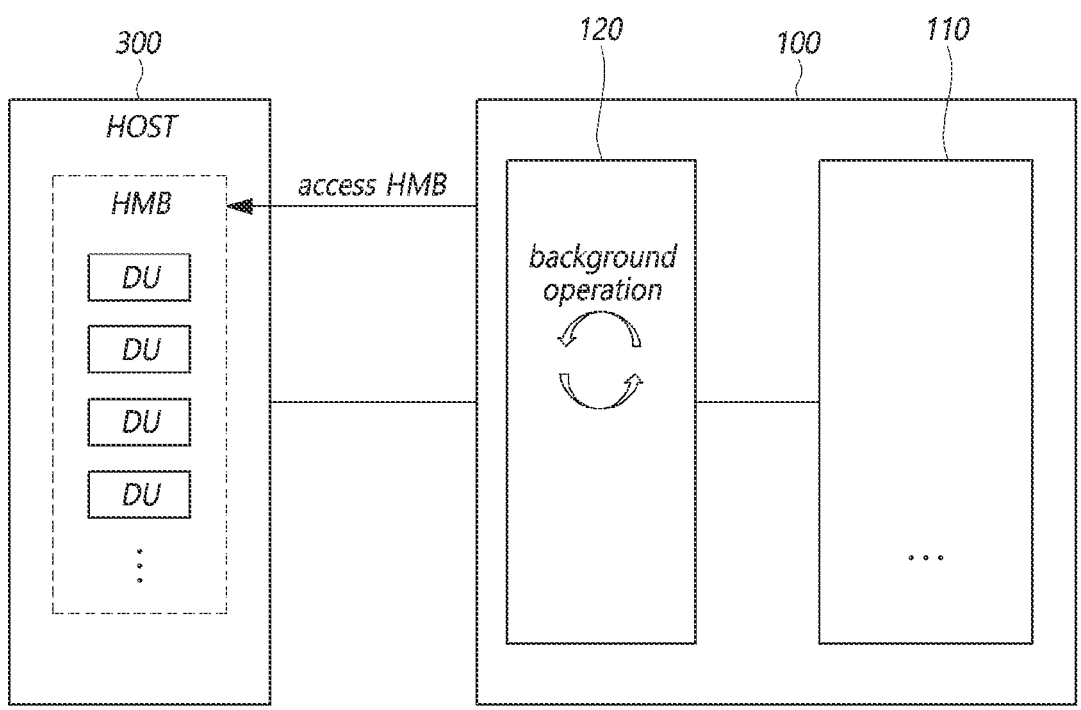
FIG. 3 illustrates a schematic structure of a system according to embodiments of the present disclosure.

FIG. 3 illustrates a schematic structure of a system 10 according to embodiments of the present disclosure.

Referring to FIG. 3, the system 10 may include a host 300 and the storage device 100.

The host 300 may be connected to the storage device 100. The storage device 100 may be one of a plurality of devices connected to the host 300.

The host 300 may include a host memory buffer HMB. The host memory buffer HMB may be set in a host memory (not shown) included in the host 300. For example, the host memory (not shown) may be a volatile memory (e.g., SRAM, DRAM) included in the host 300.

The host memory buffer HMB may be located inside the host 300 but may be used exclusively by the storage device 100.

The host 300 may transmit information related to the host memory buffer HMB to the storage device 100 so that the storage device 100 can access the host memory buffer HMB.

A plurality of data units DU may be stored in the host memory buffer HMB. The plurality of data units DU may be used by the storage device 100. For example, the plurality of data units DU may be part of user data stored in the storage device 100 or meta data for user data.

The storage device 100 may include a memory 110 and a controller 120.

The memory 110 may store data. The memory 110 may include a plurality of memory blocks to store data.

The controller 120 may execute a background operation (e.g., garbage collection, wear leveling, read reclaim, trim). The controller 120 may execute a background operation according to a preset condition, regardless of a request from the host 300.

The controller 120 may read the plurality of data units DU stored in the host memory buffer HMB from the host memory buffer HMB in order to execute a background operation.

The storage device 100 may enter a low power mode. When the storage device 100 enters the low power mode, the storage device 100 may operate to consume less power than in a normal mode. For example, the storage device 100 may deactivate some of the operations activated in the normal mode in the low power mode to reduce power consumption. Further, the term "deactivate" may be referred to as "sleep", "idle", "standby", and the like.

The storage device 100 may enter a low power mode when a specific condition is satisfied.

For example, the storage device 100 may enter a low power mode according to the request of the host 300. The host 300 may transmit a request for entering into the low power mode to the storage device 100, and the controller 120 of the storage device 100 may receive the request and cause the storage device 100 to enter the low power mode.

As another example, the storage device 100 may automatically enter a low power mode when a condition for entering the low power mode (e.g., no request received from the host 300 for a predetermined time period) is satisfied. In this case, the controller 120 of the storage device 100 may transmit a signal indicating that the storage device 100 enters the low power mode to the host 300.

When the storage device 100 is in a low power mode, power supply from the host 300 may be cut off, and access to the host 300 may be impossible. At this time, the storage device 100 may be unable to access the host memory buffer HMB.

When the storage device 100 enters a low power mode, the controller 120 may enter the low power mode after executing a background operation that needs to be executed before entering the low power mode. For example, when it is determined that the storage device 100 is not yet ready to enter the low power mode before entering the low power mode, the storage device 100 may execute a background operation that has not been executed in runtime and then enter the low power mode.

This will be described in detail in FIG. 4 below.

Figure 4:
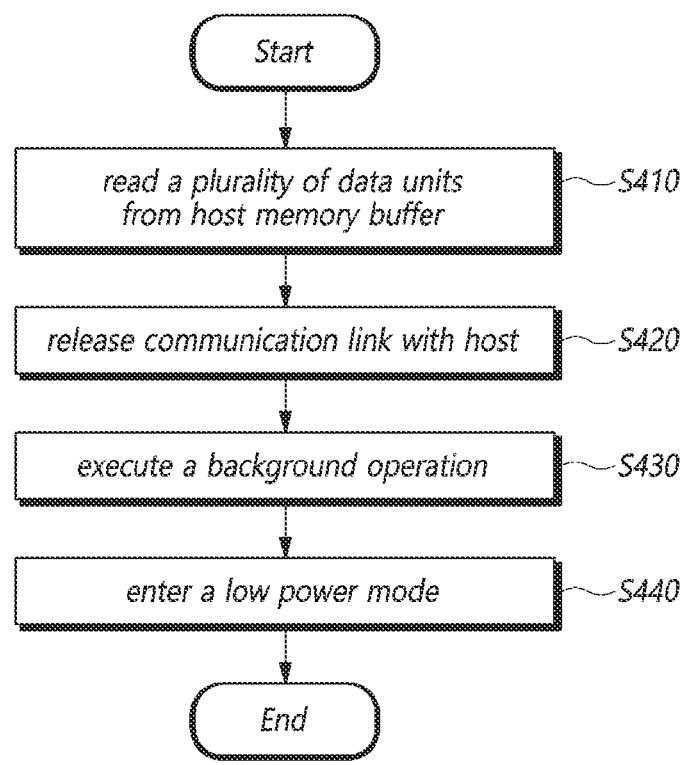
FIG. 4 illustrates a flow chart illustrating an operation of a storage device to enter a low power mode according to embodiments of the present disclosure.

FIG. 4 illustrates a flow chart illustrating an operation of the storage device 100 to enter a low power mode according to embodiments of the present disclosure.

Referring to FIG. 4, the controller 120 of the storage device 100 may read the plurality of data units DU stored in the host memory buffer HMB of the host 300 from the host memory buffer HMB before entering the low power mode (S410).

After reading the plurality of data units DU, the controller 120 may release a communication link with the host 300 (S420). At this time, it is impossible for the controller 120 to access the host memory buffer HMB. The host 300 may deactivate some functions of the host 300 by entering a low power mode after the communication link is released.

Then, the controller 120 may execute a background operation based on one or more of the data units read from the host memory buffer HMB (S430). Since the communication link with the host 300 is released and it is impossible to access the host memory buffer HMB, the controller 120 may execute the background operation using the data units read from the host memory buffer HMB.

After executing the background operation, the controller 120 may enter the storage device 100 into a low power mode (S440).

The low power mode may be a candidate low power mode, among a plurality of candidate low power modes, which enables the storage device 100 to consume power equal to or greater than a threshold power consumption. The amount of power consumption of candidate low power modes may be different from each other.

For example, the low power mode may be a sleep mode. In the sleep mode, the storage device 100 cannot execute an operation requested by the host 300 and can execute only a background operation.

For example, the low power mode may be a deep sleep mode. In the deep sleep mode, in order to use minimum power for maintaining data stored in the storage device 100, the storage device 100 may turn off, among components of the storage device 100, components other than components required to maintain data stored in the storage device 100.

Depending on the mode of the storage device 100, the amount of power consumed by the storage device 100 may vary. For example, the amount of power consumed by the storage device 100 may be decreased in the order of a mode for performing a write operation, a mode for performing a read operation, a sleep mode, and a deep sleep mode.

The controller 120 may execute a background operation when entering a low power mode capable of consuming power equal to or greater than a threshold power consumption, and may not execute a background operation when entering another low power mode.

Figure 5:
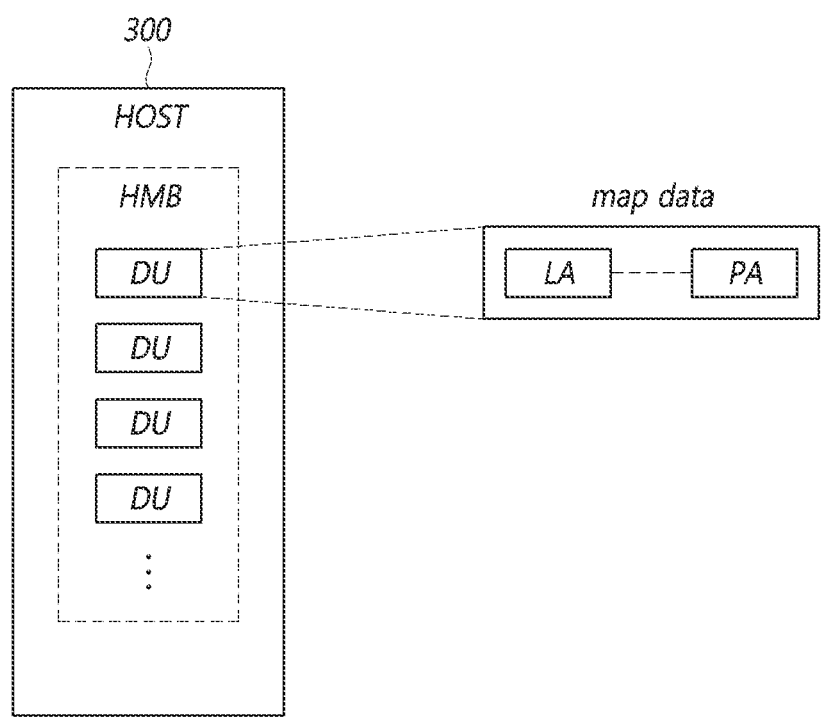
FIG. 5 illustrates an example of a plurality of data units according to embodiments of the present disclosure.

FIG. 5 illustrates an example of a plurality of data units DU according to embodiments of the present disclosure.

Referring to FIG. 5, each of the plurality of data units DU may be map data indicating a mapping relationship between logical address area LA and physical address LA.

In this case, the size of the logical address area LA and the physical address area PA indicated by the map data may be multiples of the size of a page (e.g., 4 KB).

The map data may include a plurality of sub map data units, and each sub map data unit may indicate a mapping relationship between a logical address area and a physical address area having a designated size.

The storage device 100 may use the host memory buffer HMB of the host 300 to load the map data. Due to a resource limitation of the storage device 100, the storage device 100 may not secure enough space inside the storage device 100 to load necessary map data.

At this time, the storage device 100 may overcome the resource limitation of the storage device 100 by loading map data into the host memory buffer HMB.

Figure 6:
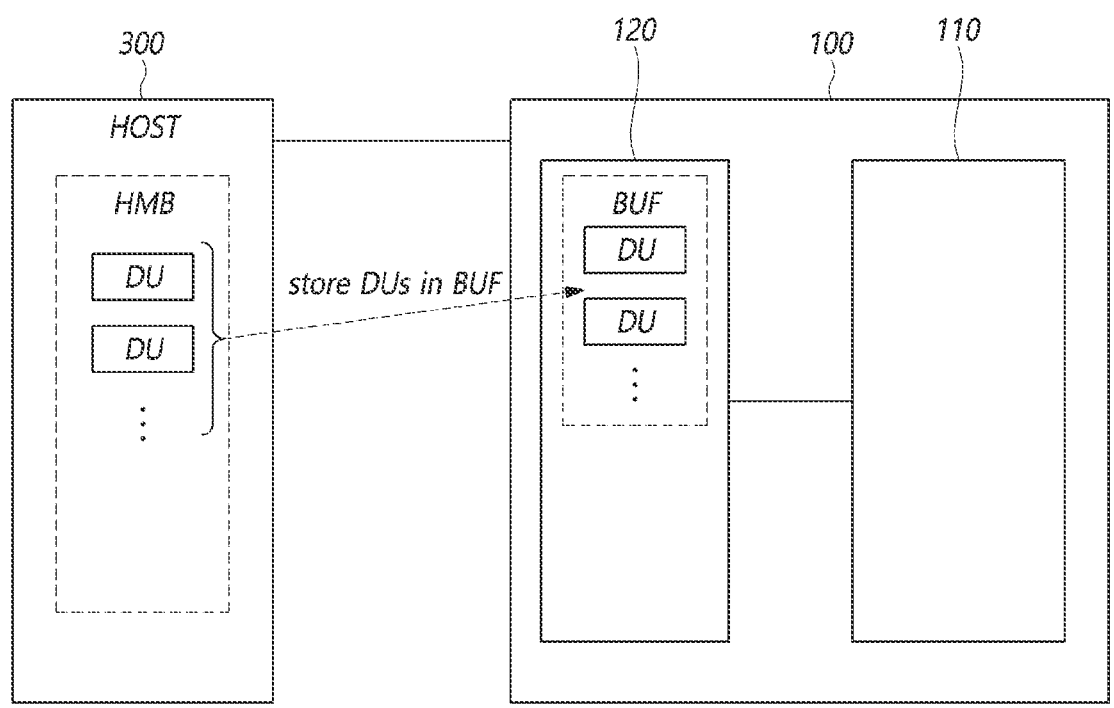
FIG. 6 illustrates an example in which a storage device stores a plurality of data units according to embodiments of the present disclosure.

FIG. 6 illustrates an example in which the storage device 100 stores a plurality of data units DU according to embodiments of the present disclosure.

Referring to FIG. 6, the controller 120 of the storage device 100 may store the plurality of data units DU read from the host memory buffer HMB in a buffer BUF.

The controller 120 may quickly access the read plurality of data units DU by using the buffer BUF, and may access the plurality of data units DU even after the communication link with the host 300 is disconnected.

For example, the buffer BUF may be set in the working memory 120 in the controller 120. As another example, the buffer BUF may be set in a separate volatile memory.

Furthermore, the controller 120 may delete data previously stored in the buffer BUF before storing the read plurality of data units DU in the buffer BUF.

Figure 7:
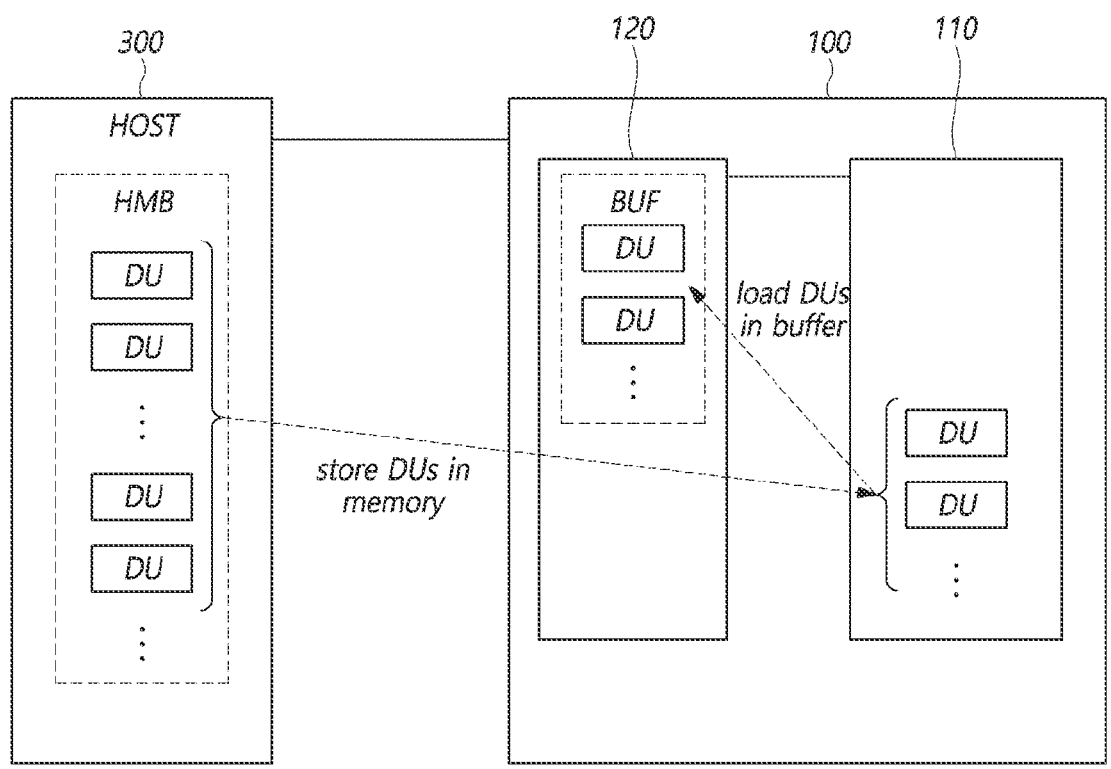
FIG. 7 illustrates another example in which a storage device stores a plurality of data units according to embodiments of the present disclosure.

FIG. 7 illustrates another example in which a storage device stores a plurality of data units according to embodiments of the present disclosure.

Referring to FIG. 7, the controller 120 of the storage device 100 may first store (dump) the plurality of data units DU read from the host memory buffer HMB in the memory 110, and the controller 120 may load all or part of the plurality of data units DU stored in the memory 110 into the buffer BUF.

Due to resource limitation of the controller 120, the size of the buffer BUF that can be allocated may be less than the total size of the plurality of data units DU. In this case, it is impossible to simultaneously store all of the plurality of data units DU in the buffer BUF.

Accordingly, the controller 120 may first store the plurality of data units DU in the memory 110 and then load part of them into the buffer BUF. The controller 120 may execute a background operation based on the data units loaded into the buffer BUF.

Figure 8:
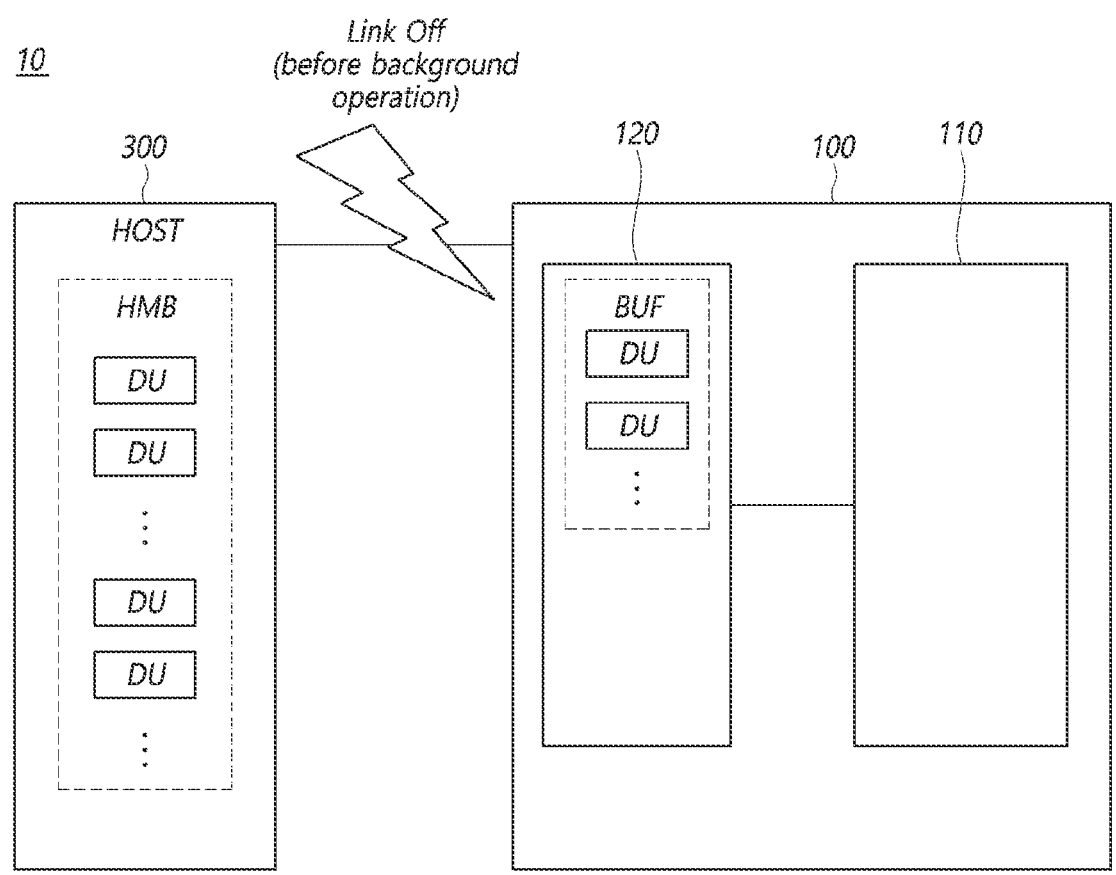
FIG. 8 illustrates an operation in which a storage device releases communication link with a host according to embodiments of the present disclosure.

FIG. 8 illustrates an operation in which the storage device 100 releases a communication link with the host 300 according to embodiments of the present disclosure.

Referring to FIG. 8, the controller 120 of the storage device 100 may release a communication link with the host 300 before executing a background operation after reading the plurality of data units DU from the host memory buffer HMB.

For example, the communication link with the host 300 may be established based on the Compute express Link (CXL) interface.

By releasing the communication link with the host 300 before the controller 120 executes the background operation, the host 300 may enter a low power mode by itself before the controller 120 completes the background operation. This is because the controller 120 does not access the host memory buffer HMB of the host 300 while executing the background operation.

Accordingly, the host 300 may more quickly enter the low power mode and minimize power consumption.

Hereinafter, embodiments in which the controller 120 executes a background operation will be described.

For example, the background operation may be a garbage collection GC operation or a trim operation.

When a garbage collection operation is executed, valid data stored in a specific area (e.g., a victim memory block) of the memory 110 may be migrated to another area. Free space in the memory 110 may be secured by deleting the specific area after the valid data is migrated to another area.

When a trim operation is executed, data corresponding to a specific logical address may be invalidated. Through this, deletion of invalidated data can be efficiently executed.

Figure 9:
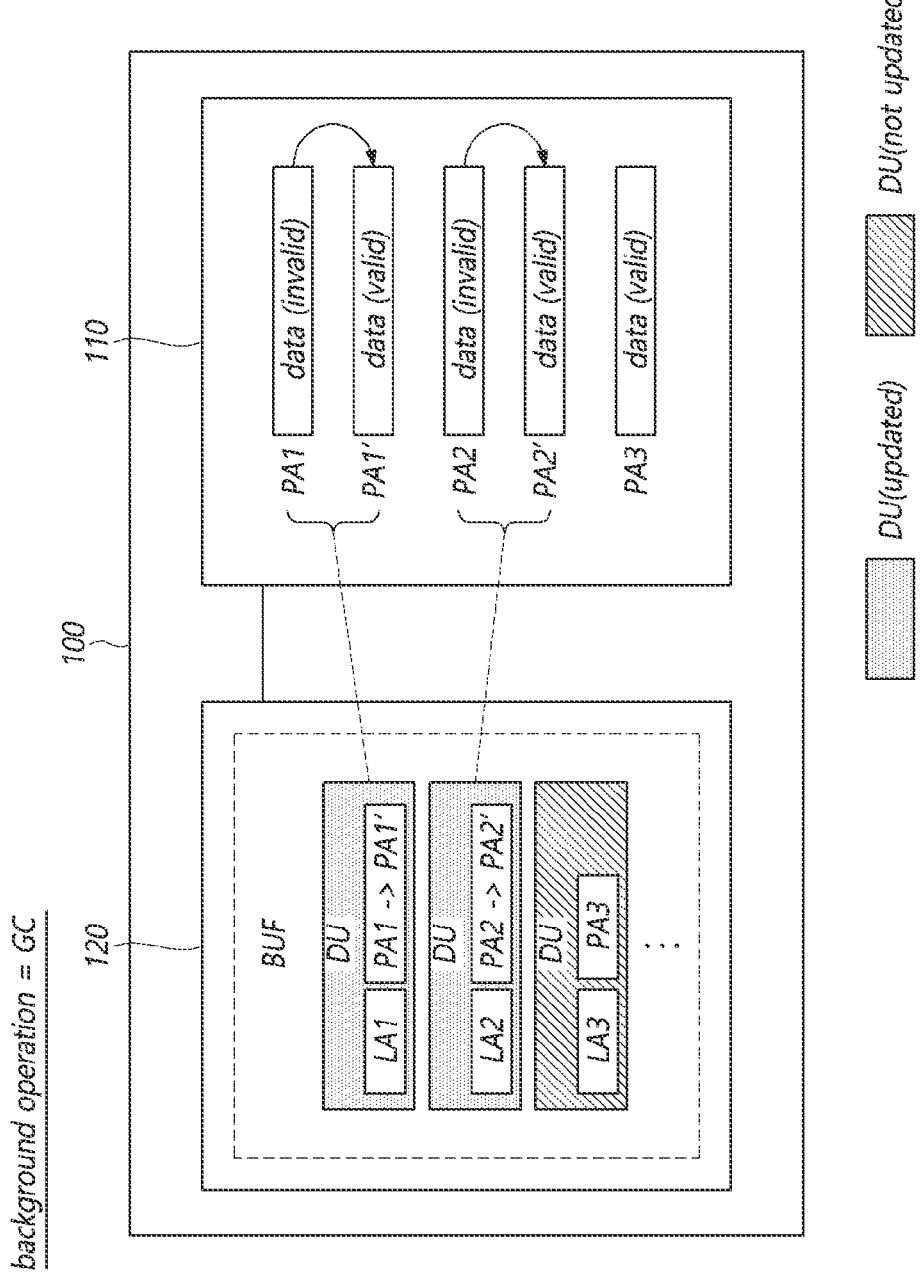
FIG. 9 illustrates an example in which a storage device executes a background operation according to embodiments of the present disclosure.
Figure 10:
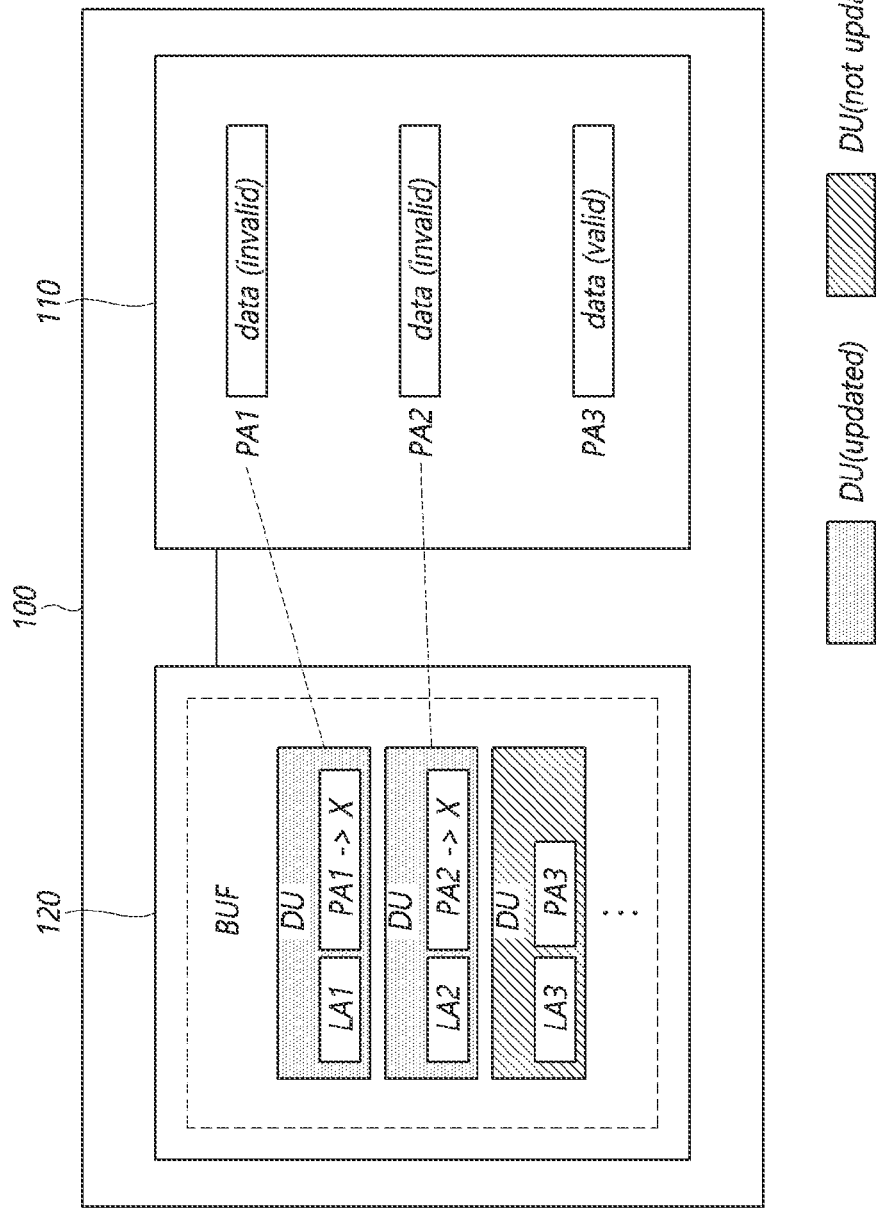
FIG. 10 illustrates another example in which a storage device executes a background operation according to embodiments of the present disclosure.

First, in FIG. 9, a case where the background operation is a garbage collection operation is described as an example, and in FIG. 10, a case where the background operation is a trim operation is described as an example.

FIG. 9 illustrates an example in which the storage device 100 executes a background operation according to embodiments of the present disclosure.

In FIG. 9, the background operation is a garbage collection operation. When executing a garbage collection operation, the controller 120 of the storage device 100 may migrate data stored in a specific area of the memory 110 to another area. The controller 120 may identify the location of a specific area included in the memory 110 through physical address area corresponding to the specific area.

In FIG. 9, the controller 120 may migrate data corresponding to logical address area LA1 from physical address area PA1 to physical address area PA1'. In this case, data previously stored in the physical address area PA1 becomes invalid, and data newly stored in the physical address area PA1' becomes valid.

At this time, among the data units DU stored in the buffer BUF, a data unit corresponding to the logical address area LA1 may be updated. In FIG. 9, a value of the physical address area included in the data unit corresponding to the logical address area LA1 may be updated from PA1 to PA1'.

Similarly, the controller 120 may migrate data corresponding to logical address area LA2 from physical address area PA2 to physical address area PA2'. In this case, data previously stored in the physical address area PA2 becomes invalid, and data newly stored in the physical address area PA2' becomes valid.

At this time, among the data units DU stored in the buffer BUF, a data unit corresponding to the logical address area LA2 may be updated. In FIG. 9, a value of the physical address area included in the data unit corresponding to the logical address area LA2 may be updated from PA2 to PA2'.

On the other hand, in FIG. 9, data corresponding to logical address LA3 has not been migrated. Therefore, among the data units DU stored in the buffer BUF, the data unit corresponding to the logical address area LA3 is not updated.

Meanwhile, the controller 120 may manage which data unit among the data units DU stored in the buffer BUF is updated through various data structures.

For example, the controller 120 may set a bitmap corresponding to the data units DU stored in the buffer BUF, and the value of a bit, among bits included in the bitmap, corresponding to the updated data unit can be changed.

As another example, the controller 120 may generate a list of update data units among the data units DU stored in the buffer BUF.

FIG. 10 illustrates another example in which the storage device 100 executes a background operation according to embodiments of the present disclosure.

In FIG. 10, the background operation is a trim operation. When executing a trim operation based on a data unit, the controller 120 of the storage device 100 may invalidate data corresponding to a logical address area indicated by the data unit. In this case, the mapping relationship between the logical address area and the physical address area included in the data unit may be released, and for this, the valid physical address area may be deleted.

In FIG. 10, the controller 120 may release the mapping relationship between logical address area LA1 and physical address area PA1. In this case, data stored in the physical address area PA1 of the memory 110 becomes invalid.

At this time, among the data units DU stored in the buffer BUF, a data unit corresponding to the logical address area LA1 may be updated. In FIG. 10, the value of the physical address included in the data unit corresponding to the logical address area LA1 may be deleted.

Similarly, the controller 120 may release the mapping relationship between logical address area LA2 and physical address area PA2. In this case, data stored in the physical address area PA2 of the memory 110 becomes invalid.

At this time, among the data units DU stored in the buffer BUF, a data unit corresponding to the logical address area LA2 may be updated. In FIG. 10, the value of the physical address included in the data unit corresponding to the logical address area LA2 may be deleted.

In FIG. 10, the controller 120 may not release the mapping relationship between logical address area LA3 and physical address area PA3. In this case, data stored in the physical address area PA3 of the memory 110 becomes valid. Among the data units DU stored in the buffer BUF, a data unit corresponding to the logical address area LA3 is not updated.

In the above, an operation when the storage device 100 enters a low power mode has been described.

Hereinafter, an operation after the storage device 100 wakes up from a low power mode will be described.

Figure 11:
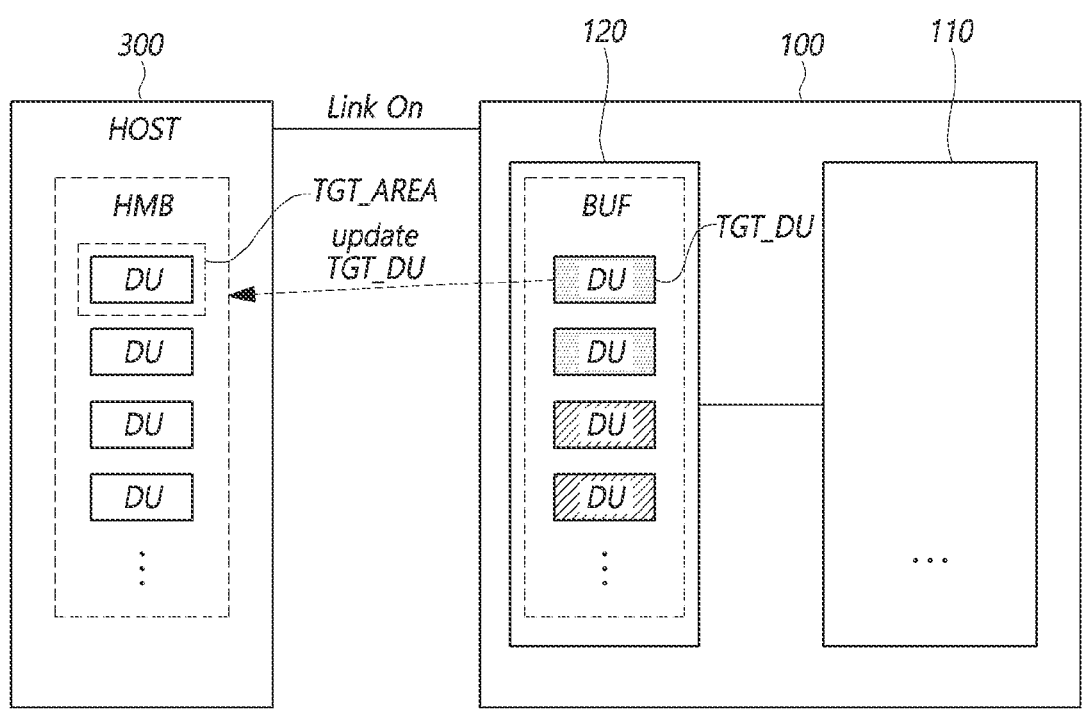
FIGS. 11 to 12 illustrate an operation after a storage device wakes up from a lower power mode according to embodiments of the present disclosure.
Figure 12:
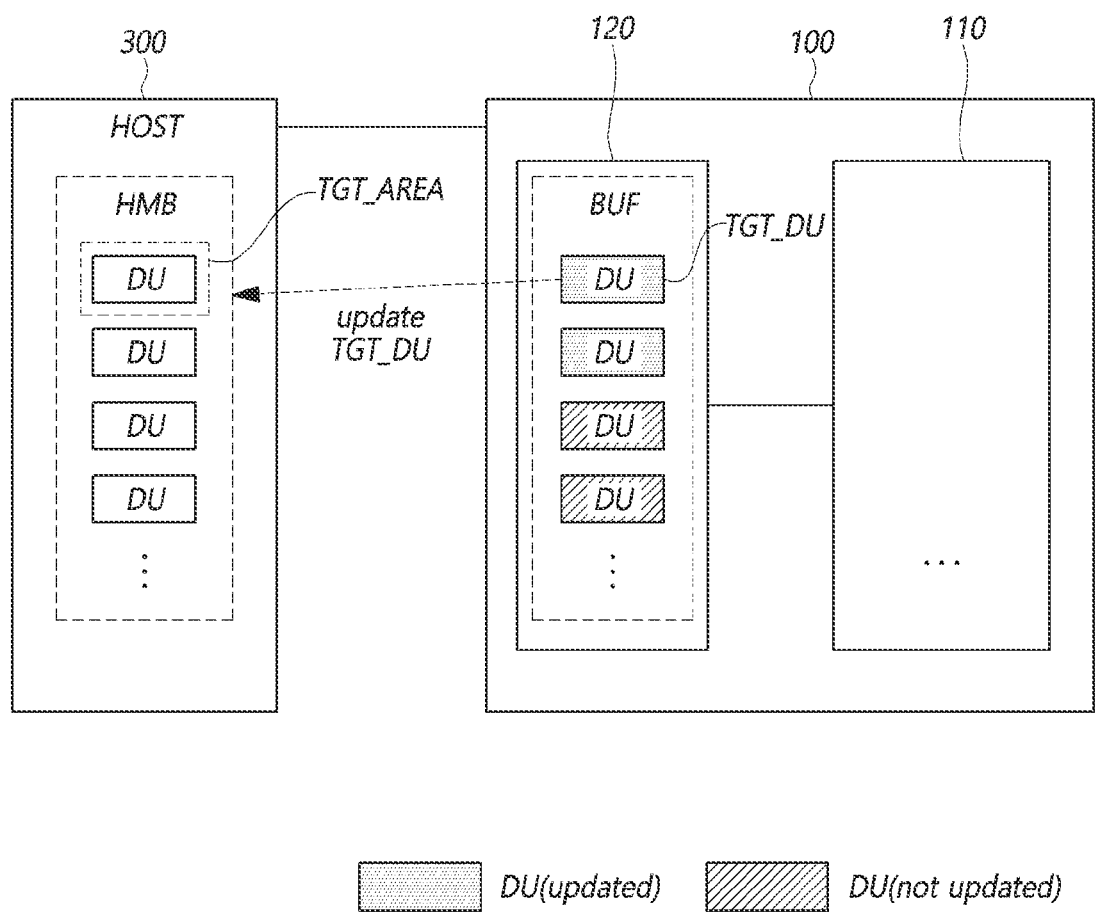

FIGS. 11 to 12 illustrate an operation after the storage device 100 wakes up from a lower power mode according to embodiments of the present disclosure.

In FIG. 11, after the storage device 100 wakes up from the low power mode, the controller 120 of the storage device 100 may reset the communication link with the host 300. In this case, the controller 120 can access the host memory buffer HMB again.

At this time, the controller 120 may update a target data unit TGT_DU, among the plurality of data units DU read from the host memory buffer HMB before entering the low power mode, to the host memory buffer HMB.

The target data unit TGT_DU may be a data unit read from a target area TGT_AREA of the host memory buffer HMB. Furthermore, the target data unit TGT_DU may be a data unit updated while executing the background operation before entering the low power mode.

In FIG. 12, the controller 120 may overwrite the target data unit TGT_DU in the target area TGT_AREA. That is, the controller 120 may write the updated target data unit TGT_DU again to the location where the target data unit TGT_DU was previously stored before entering the low power mode.

Figure 13:
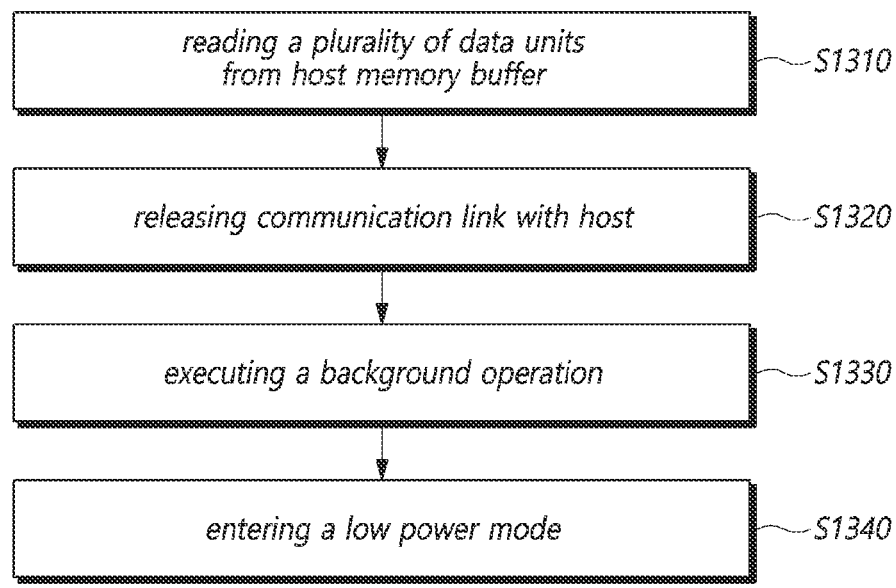
FIG. 13 illustrates an operating method of a storage device according to embodiments of the present disclosure.

FIG. 13 illustrates an operating method of the storage device 100 according to embodiments of the present disclosure.

Referring to FIG. 13, the operating method of the storage device 100 may include reading, before entering a low power mode, the plurality of data units DU stored in the host memory buffer HMB of the host 300 from the host memory buffer HMB (S1310).

As described above, the storage device 100 may enter the low power mode according to the request of the host 300 or may enter the low power mode by itself when a condition for entering the low power mode is satisfied.

Each of the plurality of data units DU may be map data indicating a mapping relationship between logical address area and physical address area.

The operating method of the storage device 100 may include releasing the communication link with the host 300 (S1320).

The operating method of the storage device 100 may include executing a background operation based on at least one of the data units DU read from the host memory buffer HMB (S1330). The storage device 100 may release the communication link with the host 300 before executing the background operation.

The operating method of the storage device 100 may include entering into the low power mode after executing the background operation (S1340).

The operating method of the storage device 100 may further include resetting the communication link with the host 300 after waking up from the low power mode, and updating the target data unit TGT_DU among the data units DU read from the host memory buffer HMB in the host memory buffer HMB. The target data unit TGT_DU may be a data unit read from the target area TGT_AREA of the host memory buffer HMB and updated while executing the background operation.

The updating the target data unit TGT_DU in the host memory buffer HMB may overwrite the target data unit TGT_DU in the target area TGT_AREA.

Although embodiments of the present disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims. Furthermore, the embodiments may be combined to form additional embodiments.

What is claimed is:

1. A storage device comprising:
   a memory configured to store data; and
   a controller configured to:
   receive, from a host, a request for entering a low power mode;
   read, prior to entering the low power mode, a plurality of data units from a host memory buffer;
   release a communication link with the host after reading the plurality of data units;
   execute a background operation based on at least one of the plurality of data units; and
   enter the storage device into the low power mode after executing the background operation.

2. The storage device according to claim 1,
   wherein the lower power mode includes a candidate low power mode, among a plurality of candidate low power modes, which enables to consume power equal to or greater than a threshold power consumption.

3. The storage device according to claim 2,
   wherein the lower power mode includes a sleep mode in which only the background operation is executable, or a deep sleep mode using minimum power to maintain the data.

4. The storage device according to claim 1,
   wherein each of the plurality of data units includes map data indicating a mapping relationship between logical address area and physical address area.

5. The storage device according to claim 1,
   wherein the controller is configured to store the plurality of data units in the memory or a buffer included in the controller.

6. The storage device according to claim 5,
   wherein the controller is further configured to delete data previously stored in the buffer before storing the plurality of data units in the buffer.

7. The storage device according to claim 1,
   wherein the controller is configured to release the communication link with the host before executing the background operation.

8. The storage device according to claim 7,
   wherein the communication link is established based on the Compute eXpress Link (CXL) interface.

9. The storage device according to claim 1,
   wherein the background operation includes a garbage collection operation or a trim operation.

10. The storage device according to claim 1,
    wherein the controller is further configured to:
    reset, after waking up from the low power mode, the communication link with the host; and
    update a target data unit among the plurality of data units into the host memory buffer, and
    wherein the target data unit is a data unit read from a target area of the host memory buffer and updated while executing the background operation.

11. The storage device according to claim 10,
    wherein the target data unit is overwritten in the target area when updating the target data unit.

12. An operating method of a storage device, the operating method comprising:
    reading, prior to entering a low power mode, a plurality of data units from a host memory buffer;
    releasing a communication link with a host;
    executing a background operation based on at least one of the plurality of data units; and
    entering into the low power mode after executing the background operation.

13. The operating method of claim 12,
    wherein each of the plurality of data units includes map data indicating a mapping relationship between a logical address area and a physical address area.

14. The operating method of claim 12,
    wherein the communication link is released before executing the background operation.

15. The operating method of claim 12, further comprising:
resetting the communication link with the host after waking up from the low power mode; and
updating a target data unit among the plurality of data units into the host memory buffer;
wherein the target data unit is a data unit read from a target area of the host memory buffer and updated while executing the background operation.

16. The operating method of claim 15,
wherein the updating the target data unit comprises overwriting the target data unit in the target area.

17. The operating method of claim 12, further comprising receiving, prior to reading the plurality of data units, a request for entering a low power mode from the host.

18. The operating method of claim 12, further comprising:
determining whether a condition for the storage device to enter a low power mode is satisfied; and
transmitting, when the condition is satisfied, a signal indicating that the storage device entered the low power mode to a host.

19. A storage device comprising:
a memory configured to store data; and
a controller configured to:
determine whether a condition for the storage device to enter a low power mode is satisfied;
transmit a signal indicating that the storage device entered the low power mode to a host when the condition is satisfied;
read a plurality of data units from a host memory buffer included in the host;
release a communication link with the host after reading the plurality of data units;
execute a background operation based on at least one of the plurality of data units; and
enter the storage device into the low power mode after executing the background operation.

20. The storage device according to claim 19,
wherein the controller is configured to determine that the condition is satisfied when there is no request received from the host for a set time period.

* * * * *